(12) United States Patent
Liu

(10) Patent No.: US 7,477,510 B2
(45) Date of Patent: Jan. 13, 2009

(54) KEYBOARD-VIDEO-MOUSE (KVM) DEVICE MOUNTING SYSTEM

(75) Inventor: Chien-Hsing Liu, Shijr (TW)

(73) Assignee: Asia Optical Co., Inc, Taipei (TW)

( * ) Notice: Subject to any disclaimer, the term of this patent is extended or adjusted under 35 U.S.C. 154(b) by 302 days.

(21) Appl. No.: 11/530,521

(22) Filed: Sep. 11, 2006

(65) Prior Publication Data

US 2008/0062632 A1 Mar. 13, 2008

(51) Int. Cl.
*G06F 1/16* (2006.01)
(52) U.S. Cl. ...................... 361/683; 361/686
(58) Field of Classification Search .............. 361/683, 361/686
See application file for complete search history.

(56) References Cited

U.S. PATENT DOCUMENTS

| | | | | |
|---|---|---|---|---|
| 4,501,460 A * | 2/1985 | Sisler | ........................ | 361/730 |
| 4,680,674 A * | 7/1987 | Moore | ........................ | 361/686 |
| 5,097,388 A * | 3/1992 | Buist et al. | ................... | 361/686 |
| 6,414,841 B1 * | 7/2002 | Chang | ........................ | 361/682 |
| 6,480,374 B1 * | 11/2002 | Lee | ............................ | 361/681 |
| 6,560,094 B2 * | 5/2003 | Schmidt | ..................... | 361/681 |
| 6,674,638 B2 * | 1/2004 | Hsien-Chin | ................. | 361/683 |

* cited by examiner

*Primary Examiner*—Lisa Lea-Edmonds

(57) ABSTRACT

A mounting system is described. The mounting system suitable for a computer management system comprises a video display device and one or more KVM devices. The video display device has a plurality of first attaching holes allocated on its back side. The KVM device has a plurality of second attaching holes such that it is able to be compactly mounted on the back of the video display device by screwing and fastening a corresponding number of fastening devices into the first and second attaching holes. The mounting system economizes the occupied space of a KVM device and shortens the cables for data communication in a computer management system.

20 Claims, 6 Drawing Sheets

KEYBOARD-VIDEO-MOUSE (KVM) DEVICE MOUNTING SYSTEM

FIELD OF THE INVENTION

The present invention relates to a mounting system, and more particularly to a keyboard-video-mouse device mounting system for a computer management system.

BACKGROUND OF THE INVENTION

A keyboard-video-mouse (KVM) switch has been developed as an important solution in a computer management system for management a plurality of computers via a single console station. Traditionally, a KVM switch is set on a desk and locates apart from the console station which usually includes a keyboard, a video display device, a mouse or other console devices. However, due to such arrangement, the KVM switch occupies and reduces available space for the console station on the desk. In addition, other KVM devices, such as the KVM console modules, KVM extenders, and video extenders are generally located adjoining the console station and may have the same drawback.

Moreover, the cable connections between the KVM devices and the console station are too long. As a result, it is necessary to shorten the cable connections between the KVM devices and the console station to decrease the manufacturing cost.

Consequently, there is a need to develop a mounting system to solve above-mentioned problems.

SUMMARY OF THE INVENTION

One object of the present invention is to provide a mounting system to economize the occupied space of a KVM device in a computer management system.

Another object of the present invention is to provide a mounting system to shorten the cable connections between the KVM devices, such as KVM switches, KVM console modules, KVM extenders and video extenders, and console devices to save the cost and length of cables.

In one embodiment, the mounting system suitable for a computer management system comprises a video display device and, one or more KVM devices. The video display device has a plurality of first attaching holes, such as four holes or any arbitrary number of holes, allocated on a back side of the video display device. The KVM device has a plurality of second attaching holes such that it is able to be compactly mounted to the video display device by screwing and fastening a corresponding number of fastening devices into the first and second attaching holes. The first attaching holes of the video display device and the second attaching holes of the KVM device are allocated in spaced apart each other. Furthermore, the first and second attaching holes may be made compatible with the Flat Display Mounting Interface (FDMI) standard which is a standard that defines the mounting interface for a variety of flat displays. According to this standard, the attaching holes on the back of the video display device are manufactured with an array arrangement in 75 by 75 mm, 100 by 100 mm, 100 by 200 mm or 200 by 200 mm pattern.

When one or more KVM devices are required, they may also be compactly mounted against each other, i.e., in a cascade form. Since the KVM devices and the console devices are close to one another, shorter cables are required for data communication, in comparison with the prior art that the KVM devices are located on the desk. Therefore, the mounting system economizes the space use of the KVM device in the computer management system in present invention.

In another embodiment, the mounting system suitable for a computer management system comprises a video display device, a mounting device and a KVM device. The video display device has a plurality of first attaching holes, such as four holes or any arbitrary number of holes, allocated on the back side of the video display device. The mounting device has a plurality of second attaching holes and a bracket. The mounting device may be mounted on the back side of the video display device by fastening a corresponding number of fastening devices into the first and second attaching holes. The KVM device therefore may be mounted to the video display device by the bracket of the mounting device. Furthermore, the first and second attaching holes may be made compatible with the FDMI standard.

The advantages of the present invention include: (a) economizing the occupied space of a KVM device; and (b) shortening the cables required for data communication.

DETAILED DESCRIPTION OF THE PREFERRED EMBODIMENTS

Figure 1:
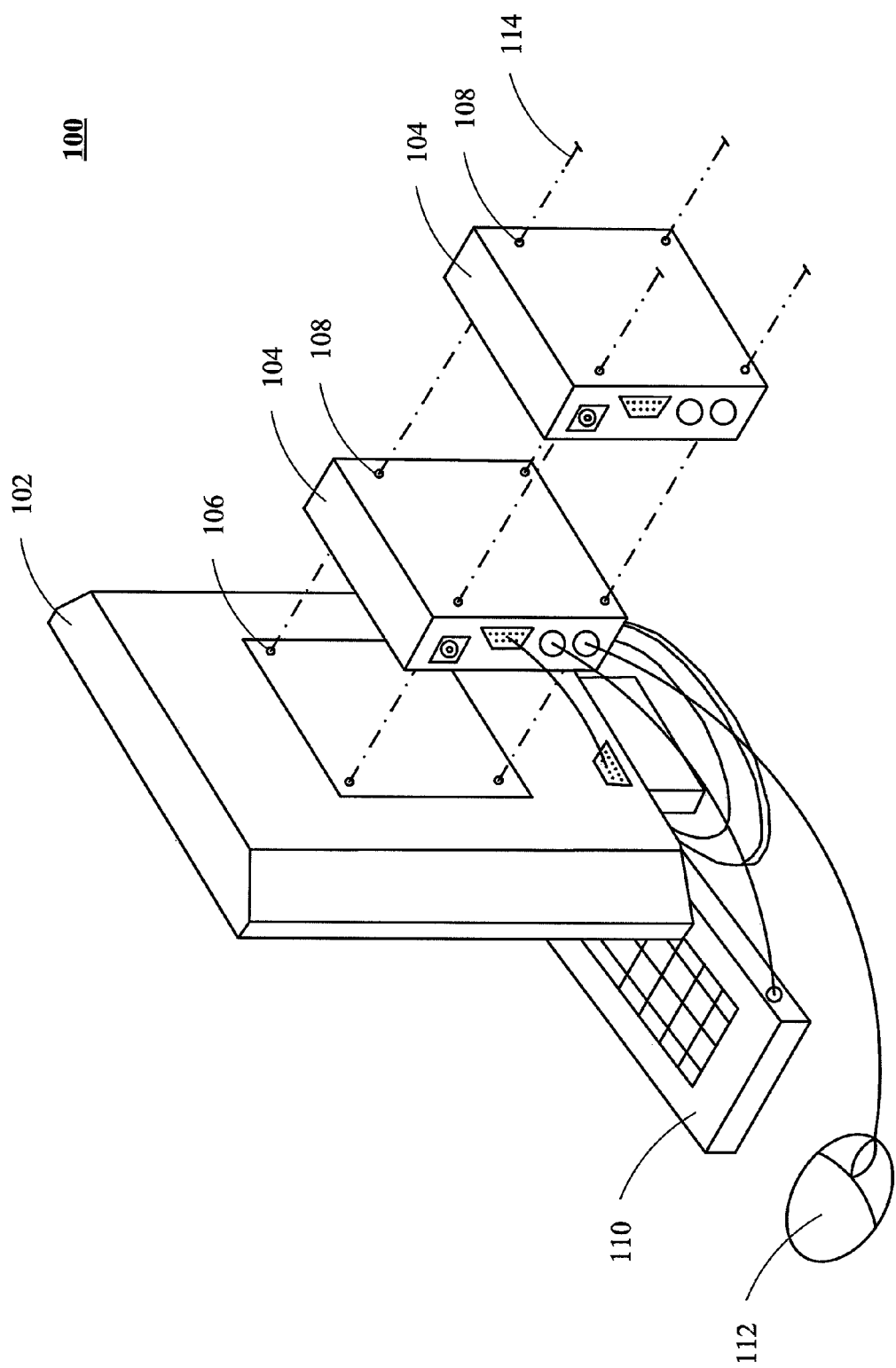
FIG. 1 is a perspective view of a mounting system according to a first embodiment of the present invention.

FIG. 1 is a perspective view of a mounting system according to a first embodiment of the present invention. The mounting system 100 suitable for a computer management system comprises a video display device 102 and one or more KVM devices 104. The video display device 102 has a plurality of first attaching holes 106, such as four holes or any arbitrary number of holes, allocated on the back side of the video display device 102. The KVM device 104 has a plurality of second attaching holes 108 such that it is compactly mounted to the back of the video display device 102 by screwing and fastening a corresponding number of fastening devices 114 into the first attaching holes 106 of the video display device 102 and the second attaching holes 108 of the KVM device 104, respectively. That is, the second attaching holes 108 are attached to the first attaching holes 106 together by the fastening devices 114, such as bolts, so that a KVM device 104 is directly fixed on the back side of the video display device 102. Therefore, the mounting system 100 economizes the space occupied by the KVM device 104. Thus, user can easily and conveniently manage the computers via the keyboard 110, the video display device 102 and the mouse 112 connecting to the KVM device 104.

The KVM device 104 may be a KVM switch, a console module for a KVM switch, a KVM extender, or a video extender. If additional KVM devices 104 are required, they may also be compactly mounted against each other via the attaching holes, as shown in FIG. 1 that two KVM devices 104 are cascaded. Since the KVM devices 104 and the console devices (102, 110, 112) are close to one another, shorter cables are required for data communication, in comparison with the prior art. For KVM devices supporting other peripherals, such as audio devices (speaker and/or microphone) and Universal Serial Bus (USB) devices, the cable length may also be saved while employing the present invention.

The first attaching holes 106 of the video display device 102 and the second attaching holes 108 of the KVM device 104 are allocated in spaced apart each other. Furthermore, the first and second attaching holes (106, 108) are made compatible with the FDMI standard. FDMI standard defines the mounting interface including the form-factor of attaching holes for a variety of flat displays. The detailed description of FDMI standard is depicted in FIGS. 3A-3D later.

Figure 2:
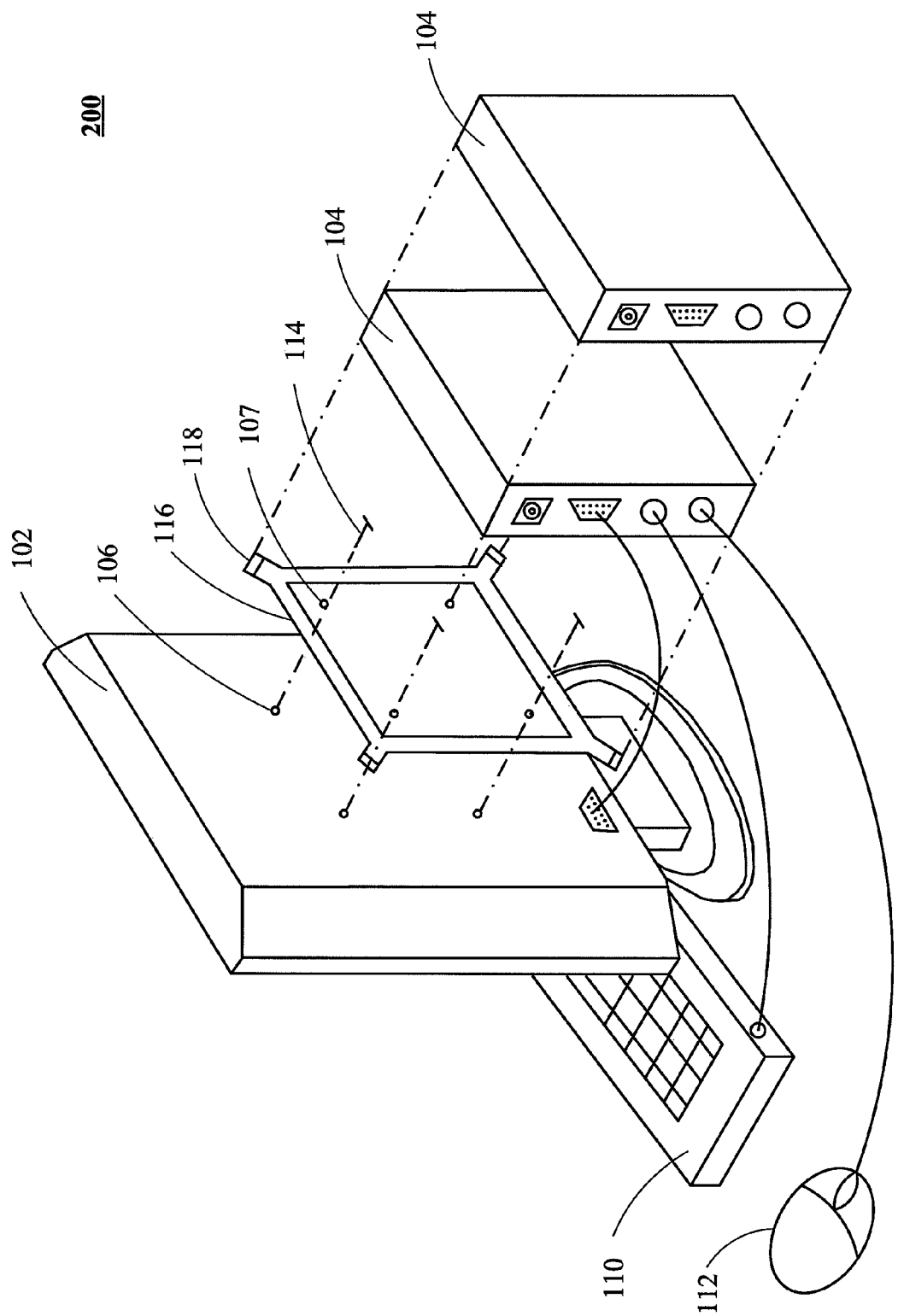
FIG. 2 is a perspective view of a mounting system according to a second embodiment of the present invention.

FIG. 2 is a perspective view of a mounting system according to a second embodiment of the present invention. The mounting system 200 suitable for a computer management system comprises a video display device 102, a mounting device 116 and a KVM device 104. The video display device 102 has a plurality of first attaching holes 106, such as four holes or any arbitrary number of holes, allocated on a back side of the video display device 102. The mounting device 116 has a plurality of second attaching holes 107 and a bracket 118. The mounting device 116 may be mounted on the back side of the video display device 102 by fastening a corresponding number of fastening devices 114 into the first and second attaching holes (106, 107). The KVM device 104 therefore may be attached to the video display device 102 by the bracket 118 of the mounting device 116. That is, the bracket 118 of the mounting device 116 is extended from the mounted plane of the video display device 102 to the end KVM device 104 for holding one or more KVM device 104.

The KVM device 104 may be a KVM switch, a console module for a KVM switch, a KVM extender, or a video extender. If an additional KVM device 104 is required, it may also be compactly mounted against the KVM device 104 before it with an additional mounting device 116, as shown in FIG. 2 that two KVM devices 104 are cascaded via a mounting device 116. Since the KVM devices 104 and the console devices (102, 110, 112) are close to one another, shorter cables are required for data communication, in comparison with the prior art. The first attaching holes 106 of the video display device 102 and the second attaching holes 107 of the mounting device 116 are allocated in spaced apart each other and they may be made compatible with the FDMI standard.

Figures 3A, 3B:
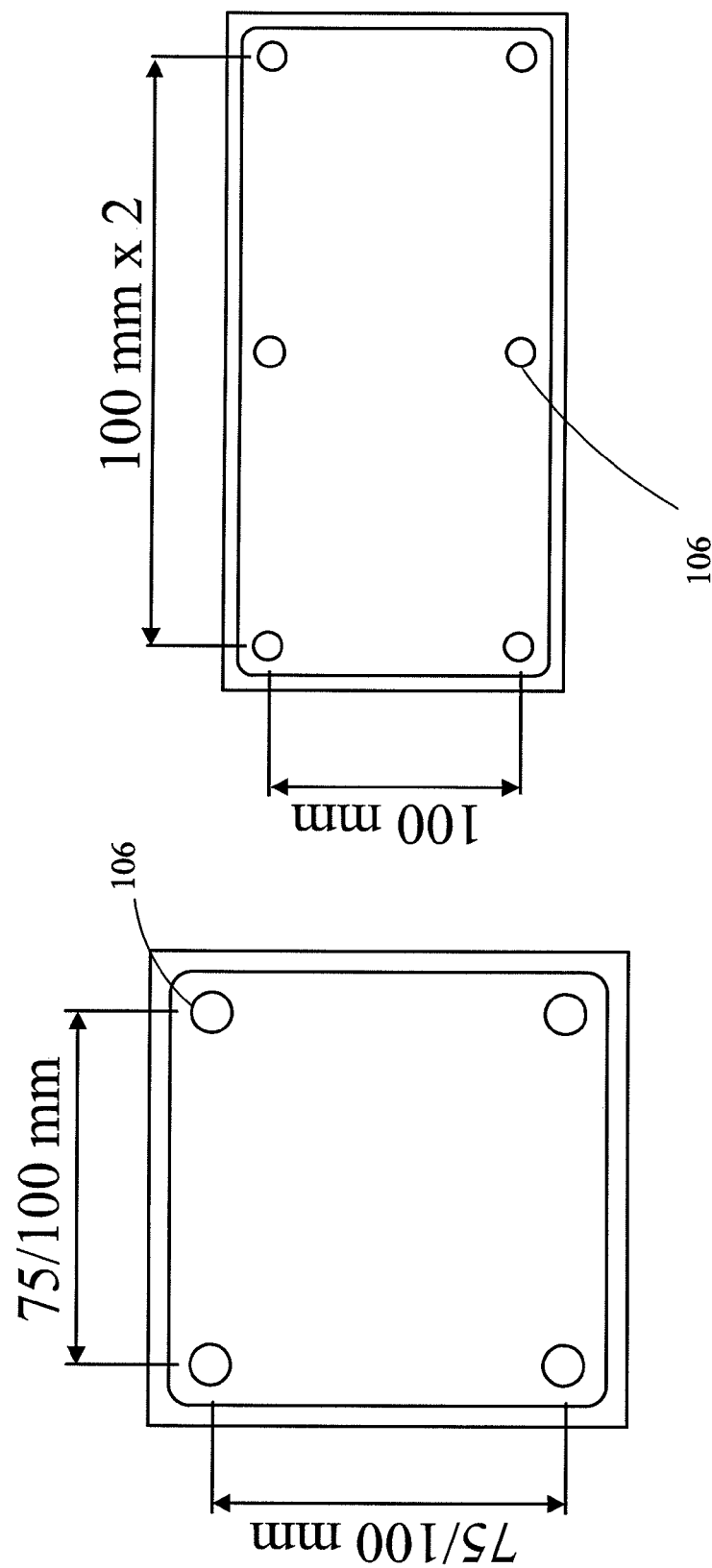
FIGS. 3A-3D illustrate diagrams of the attaching holes on the video display device, the mounting devices, and the KVM devices, which are in compliance with the FDMI standard according to the present invention.
Figure 3D:
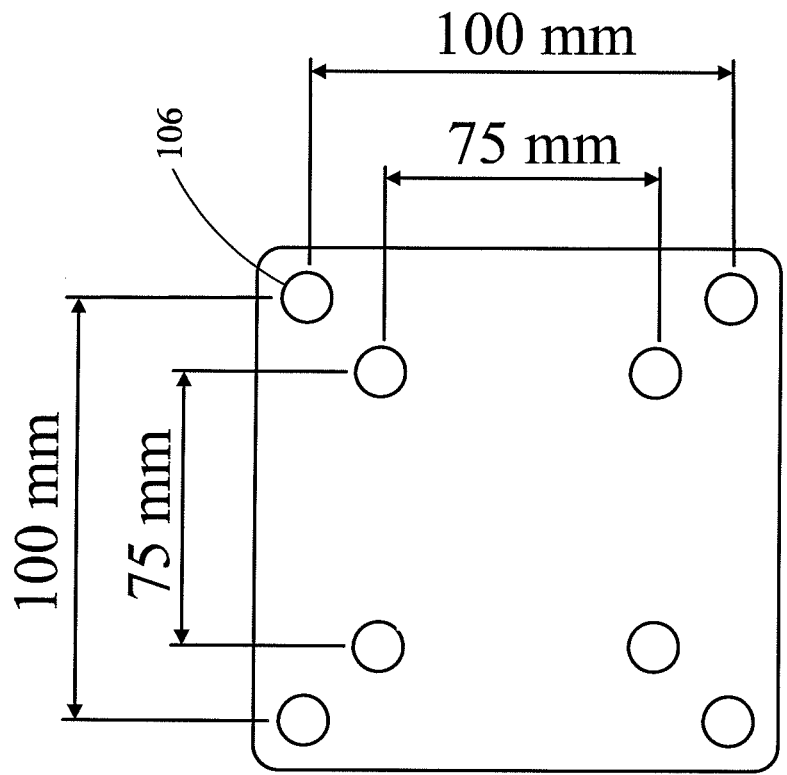
Figure 3C:
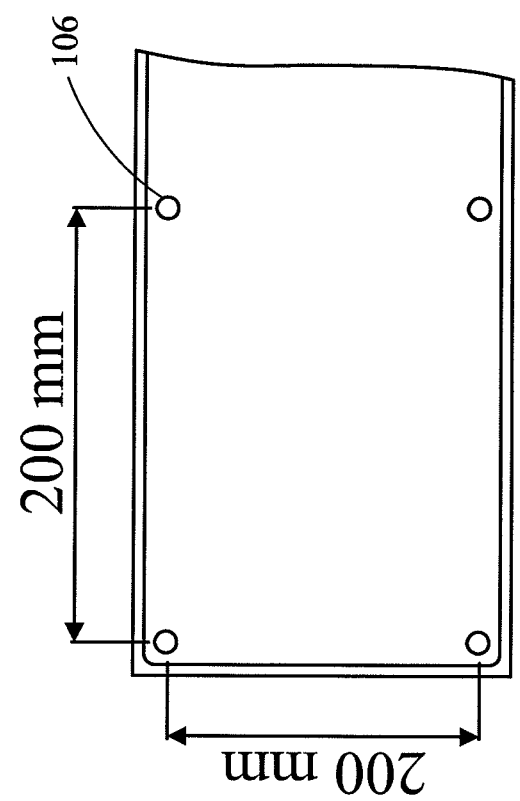

FIGS. 3A-3D illustrate arrangement diagrams of the attaching holes on the video display device, the mounting devices and the KVM device, which are made compatible with a flat display mounting interface (FDMI) standard according to the present invention. Please also refer FIGS. 1 and 2. In FIG. 3A, the attaching holes 106 on the back of the video display device 102 are manufactured with an array arrangement in either a 75 by 75 mm or 100 by 100 mm pattern. In FIG. 3B, the attaching holes 106 on the back of the video display device 102 are manufactured with the array arrangement in either a 100 by 100 mm or 100 by 200 mm pattern. In FIG. 3C, the attaching holes 106 on the back of the video display device 102 are manufactured with the array arrangement in a 200 by 200 mm pattern. In FIG. 3D, the attaching holes 106 on the back of the video display device 102 are manufactured with the array arrangement in 75 by 75 mm and 100 by 100 mm patterns. The people skilled in the art should be noted that the intervals of the attaching holes are adaptively changeable on the basis of FDMI standard. Moreover, the array arrangements of the attaching holes 106 in the above are applicable to the mounting devices 116 and the KVM device 104.

Figure 4A:
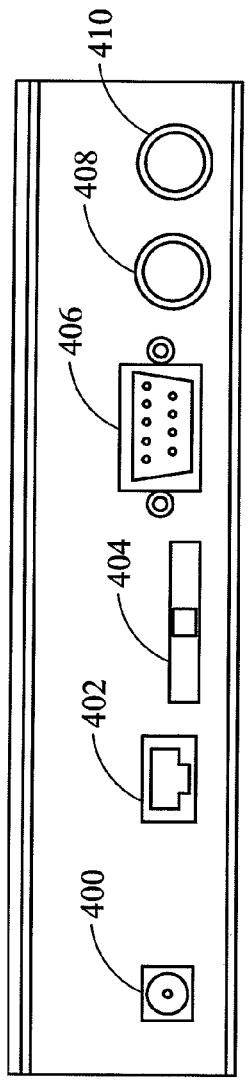
FIGS. 4A-4C illustrate connecting interfaces of the KVM devices according to the present invention.
Figure 4B:
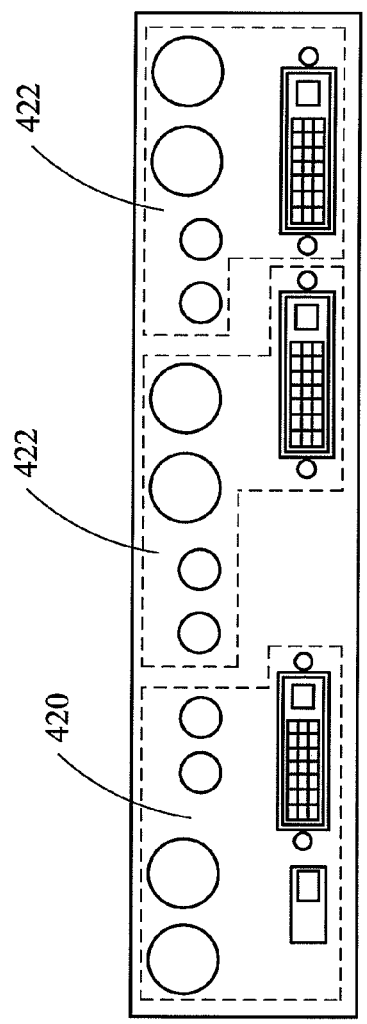
Figure 4C:
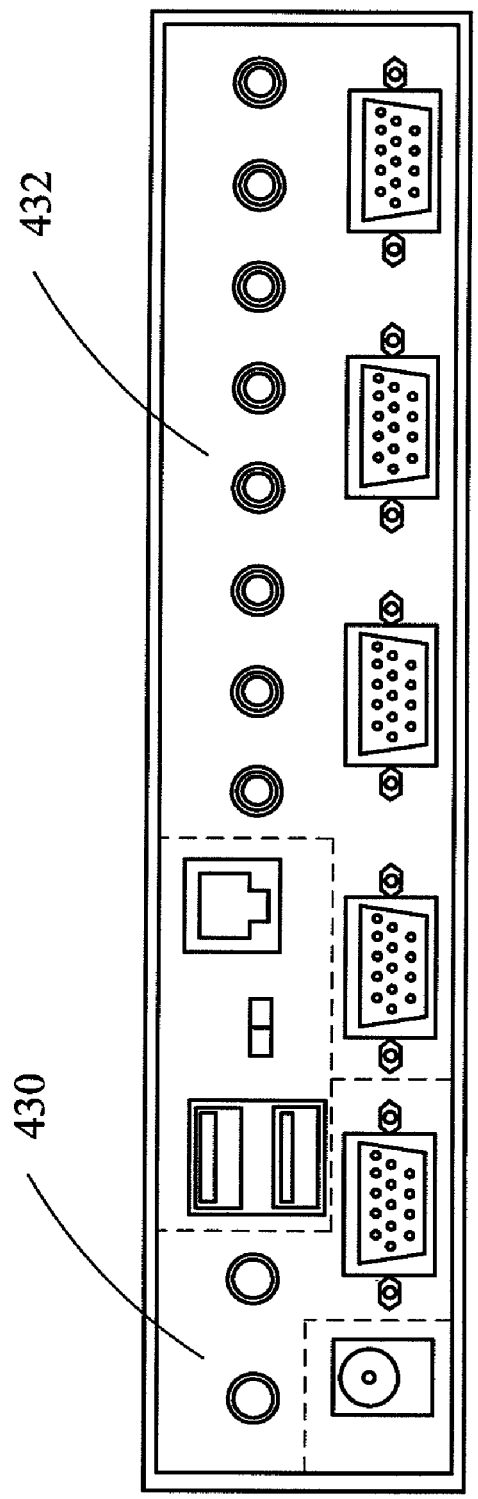

FIGS. 4A-4C illustrate connecting interface diagrams of the KVM devices according to the present invention. If the KVM device is a console module, it is shown in FIG. 4A. The connecting interface of console module comprises a power jack 400 connected to a power source via power adaptor, an I/O jack 402 connected to a KVM switch, and a firmware upgrade recovery switch 404 for switching between a normal operation and a firmware upgrade operation. Specifically, a video port 406, keyboard port 408 and mouse port 410 are used to connect to the video display device, keyboard and the mouse, respectively. It should be noted that a video port 406, keyboard port 408 and mouse port 410 can be made compatible with Universal Asynchronous Receiver Transmitter (UART), PS/2 or USB standard. If the KVM device is a KVM switch in one embodiment, it is shown in FIG. 4B, wherein control portion 420 is used to connect to a console station. Connecting interfaces 422 are for connecting to different computers. Similarly, if the KVM device is another kind of KVM switch, it is shown in FIG. 4C, wherein control portion 430 is used to connect to a console station. Connecting interfaces 432 are connected to different computers and peripheral devices.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A mounting system suitable for a computer management system having a video display device and a KVM device, the mounting system comprising:
   a plurality of first attaching holes disposed on the video display device; and
   a plurality of second attaching holes disposed on the KVM device, wherein the KVM device is mounted on the video display device by a plurality of fastening devices inserted into the second attaching holes of the KVM device and the first attaching holes of the video display device.

2. The mounting system of claim 1, wherein the plurality of first attaching holes are disposed on a back side of the video display device such that the KVM device is able to be mounted on the back side of the video display device.

3. The mounting system of claim 1, wherein the KVM device is selected from the group consisting of a KVM console module, a KVM switch, a KVM extender and a video extender.

4. The mounting system of claim 1, wherein each of the first attaching holes and each of the second attaching holes are allocated in spaced apart each other.

5. The mounting system of claim 4, wherein the first attaching holes and the second attaching holes are in compliance with FDMI standard.

6. The mounting system of claim 1, wherein the fastening devices comprises a plurality of bolts which are able to be screwed into the first attaching holes and the second attaching holes.

7. The mounting system of claim 1, wherein the computer management system further comprises at least one additional KVM device in which a plurality of third attaching holes disposed thereon such that the additional KVM device is able to be mounted on the KVM device in a cascade form by the fastening devices inserted into the third attaching holes of the additional KVM device and the second attaching holes of the KVM device.

8. A mounting system suitable for a computer management system having a video display device and a KVM device, the mounting system comprising:
 a plurality of first attaching holes disposed on the video display device; and
 a mounting device having a plurality of second attaching holes and a bracket, wherein the mounting device is able to be mounted on the video display device when a plurality of fastening devices are inserted into the second attaching holes of the mounting device and the first attaching holes of the video display device, respectively, such that the KVM device is able to be attached to the video display device by the bracket of the mounting device.

9. The mounting system of claim 8, wherein the plurality of first attaching holes are disposed on a back side of the video display device such that the mounting device is able to be mounted on the back side of the video display device.

10. The mounting system of claim 8, wherein the KVM device is selected from the group consisting of a KVM console module, a KVM switch, a KVM extender and a video extender.

11. The mounting system of claim 8, wherein each of the first and each of second attaching holes are allocated in spaced apart each other.

12. The mounting system of claim 11, wherein the first and second attaching holes are in compliance with FDMI standard.

13. The mounting system of claim 8, wherein the fastening devices comprises a plurality of bolts which are able to be screwed into the first attaching holes and the second attaching holes.

14. The mounting system of claim 8, wherein the computer management system further comprises at least one additional KVM device which is able to be attached to the KVM device in a cascade form by the bracket of the mounting device.

15. A KVM device for a computer management system having a video display device with a plurality of first attaching holes disposed thereon, the KVM device comprising:
 a plurality of second attaching holes disposed thereon, such that the KVM device is able to be mounted on the video display device by a plurality of fastening devices inserted into the second attaching holes of the KVM device and the first attaching holes of the video display device.

16. The KVM device of claim 15, wherein the plurality of first attaching holes are disposed on a back side of the video display device such that the KVM device is able to be mounted on the back side of the video display device.

17. The KVM device of claim 15, wherein each of the first attaching holes and each of the second attaching holes are allocated in spaced apart each other.

18. The KVM device of claim 17, wherein the first attaching holes and the second attaching holes are in compliance with FDMI standard.

19. The KVM device of claim 15, wherein the fastening devices comprises a plurality of bolts which are able to be screwed into the first attaching holes and the second attaching holes.

20. The KVM device of claim 15, wherein the KVM device is selected from the group consisting of a KVM console module, a KVM switch, a KVM extender and a video extender.

\* \* \* \* \*

UNITED STATES PATENT AND TRADEMARK OFFICE
CERTIFICATE OF CORRECTION

PATENT NO.         : 7,477,510 B2                                              Page 1 of 1
APPLICATION NO.    : 11/530521
DATED              : January 13, 2009
INVENTOR(S)        : Chien-hsing Liu It is certified that error appears in the above-identified patent and that said Letters Patent is hereby corrected as shown below:

Title page, item (75) Assignee: replace "Asia Optical Co., Inc., Taipei (TW)"
with --Aten International Co., Ltd., Taipei (TW)--

Signed and Sealed this

Seventh Day of September, 2010

David J. Kappos
*Director of the United States Patent and Trademark Office*